US012640130B2

(12) United States Patent
Morsy

(10) Patent No.: US 12,640,130 B2
(45) **Date of Patent: *May 26, 2026**

(54) METHOD, DEVICE AND SOFTWARE FOR APPLYING AN AUDIO EFFECT

(71) Applicant: ALGORIDDIM GMBH, Munich (DE)

(72) Inventor: Kariem Morsy, Munich (DE)

(73) Assignee: ALGORIDDIM GMBH, Munich (DE)

( * ) Notice: Subject to any disclaimer, the term of this patent is extended or adjusted under 35 U.S.C. 154(b) by 276 days.

This patent is subject to a terminal disclaimer.

(21) Appl. No.: 17/747,473

(22) Filed: May 18, 2022

(65) Prior Publication Data

US 2022/0284875 A1 Sep. 8, 2022

Related U.S. Application Data

(63) Continuation of application No. 17/459,450, filed on Aug. 27, 2021, now Pat. No. 11,462,197, which is a (Continued)

(51) Int. Cl.
*G10H 1/38* (2006.01)
*G10H 1/00* (2006.01)

(52) U.S. Cl.
CPC ........... *G10H 1/383* (2013.01); *G10H 1/0025* (2013.01); *G10H 2210/081* (2013.01); *G10H 2210/335* (2013.01)

(58) Field of Classification Search
CPC ....... G10H 2210/066; G10H 2210/076; G10H 1/0091; G10H 2210/081; G10H 1/08;
(Continued)

(56) References Cited

U.S. PATENT DOCUMENTS 5,663,517 A 9/1997 Oppenheim
5,792,971 A 8/1998 Timis et al.
(Continued)

FOREIGN PATENT DOCUMENTS

EP 1065651 A1 * 1/2001 ............... G10H 1/36
GB 2491722 A * 12/2012 ........... G06F 16/683
(Continued)

OTHER PUBLICATIONS

U.S. Appl. No. 17/459,450 , "Final Office Action", Feb. 11, 2022, 9 pages.

(Continued)

*Primary Examiner* — Jeffrey Donels
(74) *Attorney, Agent, or Firm* — Kilpatrick Townsend & Stockton LLP

(57) ABSTRACT

The present invention provides a method for processing music audio data, comprising the steps of providing input audio data representing a first piece of music containing a mixture of predetermined musical timbres, decomposing the input audio data to generate at least a first audio track representing a first musical timbre selected from the predetermined musical timbres, and a second audio track representing a second musical timbre selected from the predetermined musical timbres, applying a predetermined first audio effect to the first audio track, applying no audio effect or a predetermined second audio effect, which is different from the first audio effect, to the second audio track, and obtaining recombined audio data by recombining the first audio track with the second audio track.

20 Claims, 5 Drawing Sheets

Figure 1:
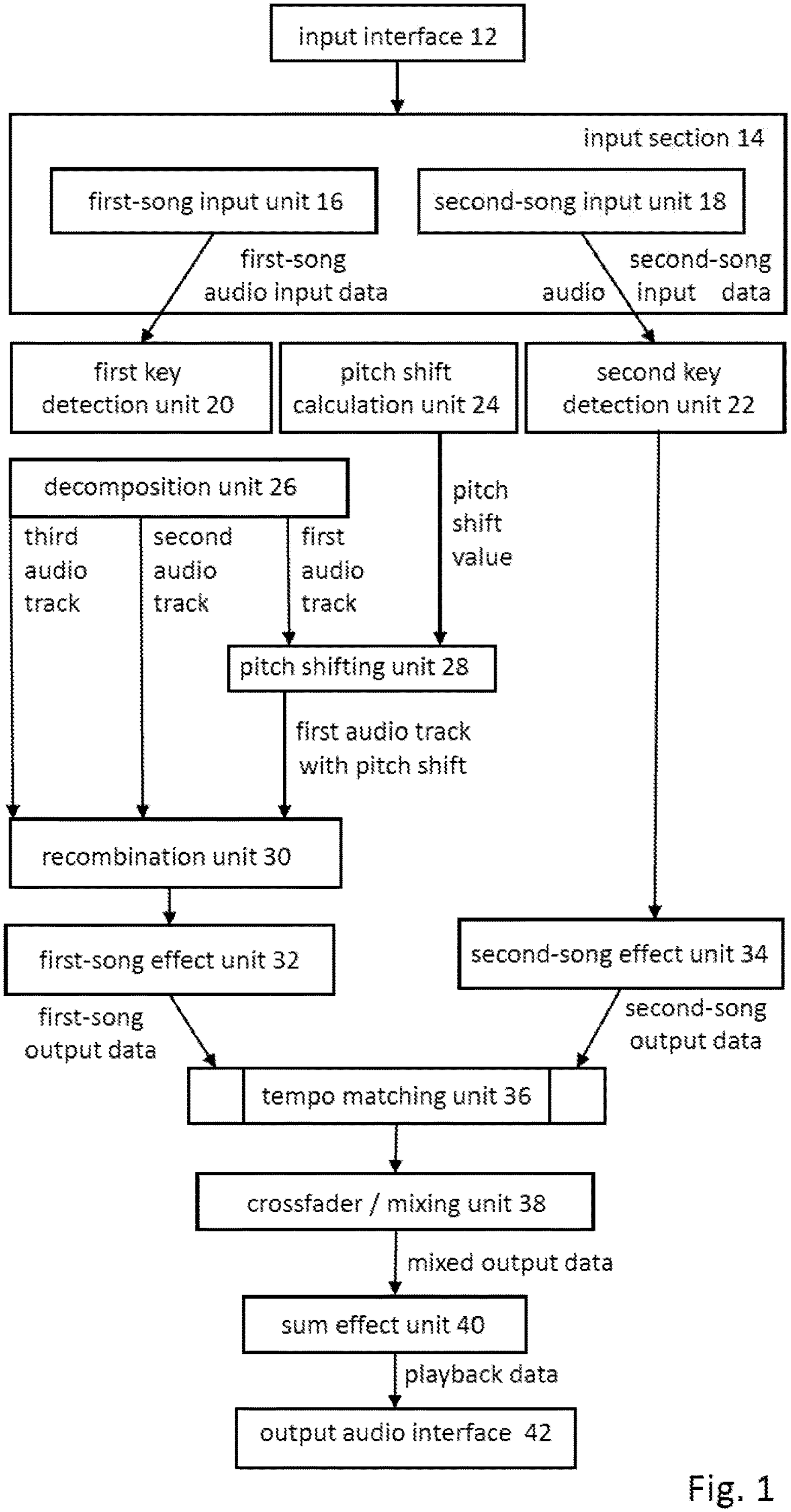

Related U.S. Application Data continuation of application No. PCT/EP2020/079275, filed on Oct. 16, 2020, which is a continuation-in-part of application No. PCT/EP2020/056124, filed on Mar. 6, 2020, and a continuation-in-part of application No. PCT/EP2020/057330, filed on Mar. 17, 2020, and a continuation-in-part of application No. PCT/EP2020/062151, filed on Apr. 30, 2020, and a continuation-in-part of application No. PCT/EP2020/065995, filed on Jun. 9, 2020, and a continuation-in-part of application No. PCT/EP2020/074034, filed on Aug. 27, 2020.

(58) Field of Classification Search

CPC ............. G10H 3/125; G10H 2210/155; G10H 2210/051; G10H 2210/331; G10H 2240/325; G10H 2210/265; G10H 2210/241; G10H 2210/165; G10H 2210/221; G10H 2210/131; G10H 2210/211; G10H 2250/055; G10H 2210/561; G10H 2210/136

See application file for complete search history.

(56) References Cited

U.S. PATENT DOCUMENTS

| | | | | |
|---|---|---|---|---|
| 6,798,886 | B1 * | 9/2004 | Smith | G10H 3/186 704/266 |
| 10,614,785 | B1 | 4/2020 | Dabby | |
| 10,887,033 | B1 * | 1/2021 | Tessmann | G10H 1/0008 |
| 11,024,276 | B1 * | 6/2021 | Dabby | G10H 1/0025 |
| 11,462,197 | B2 | 10/2022 | Morsy | |
| 2009/0038467 | A1 | 2/2009 | Brennan | |
| 2013/0339011 | A1 * | 12/2013 | Visser | G10H 1/361 704/207 |
| 2014/0018947 | A1 | 1/2014 | Ales | |
| 2014/0053711 | A1 * | 2/2014 | Serletic, II | G09B 15/00 84/613 |
| 2014/0180673 | A1 * | 6/2014 | Neuhauser | G10H 1/40 704/9 |
| 2014/0180674 | A1 * | 6/2014 | Neuhauser | G10L 25/81 704/9 |
| 2014/0180675 | A1 * | 6/2014 | Neuhauser | G10L 25/18 704/9 |
| 2016/0358594 | A1 | 12/2016 | Hilderman et al. | |
| 2017/0091983 | A1 | 3/2017 | Sebastian et al. | |
| 2017/0301372 | A1 | 10/2017 | Jehan et al. | |
| 2018/0122403 | A1 | 5/2018 | Koretzky et al. | |
| 2020/0213680 | A1 | 7/2020 | Ingel et al. | |
| 2021/0110801 | A1 | 4/2021 | Estes et al. | |
| 2021/0201863 | A1 * | 7/2021 | Bosch Vicente | G10H 1/36 |
| 2021/0279030 | A1 * | 9/2021 | Morsy | G10H 1/0091 |
| 2021/0294567 | A1 * | 9/2021 | Morsy | H04R 3/12 |
| 2021/0326102 | A1 * | 10/2021 | Morsy | G10L 21/043 |
| 2021/0390938 | A1 * | 12/2021 | Morsy | G06F 3/0482 |
| 2022/0199056 | A1 * | 6/2022 | Morsy | G06F 3/04886 |
| 2022/0284875 | A1 * | 9/2022 | Morsy | G10H 1/40 |
| 2022/0386062 | A1 * | 12/2022 | Morsy | H04S 1/002 |

FOREIGN PATENT DOCUMENTS

| | | | | | |
|---|---|---|---|---|---|
| JP | 6926354 | B1 | * | 8/2021 | G06F 1/165 |
| JP | 2022040079 | A | * | 3/2022 | G06F 3/04847 |
| WO | 2015066204 | A1 | | 5/2015 | |
| WO | WO-2019229199 | A1 | * | 12/2019 | H04S 7/30 |
| WO | WO-2021175461 | A1 | * | 9/2021 | G06F 3/0482 |
| WO | WO-2021175464 | A1 | * | 9/2021 | G06F 3/04847 |
| WO | WO-2021176102 | A1 | * | 9/2021 | G06F 1/165 |

OTHER PUBLICATIONS

U.S. Appl. No. 17/459,450 , "Non-Final Office Action", Oct. 26, 2021, 8 pages.

Cano et al., "Musical Source Separation: An Introduction", Institute of Electrical and Electronics Engineers Signal Processing Magazine, vol. 36, No. 1, Dec. 24, 2018, pp. 31-40.

International Application No. PCT/EP2020/074034 , "International Search Report and Written Opinion", Dec. 21, 2020, 16 pages.

International Application No. PCT/EP2020/079275 , "International Search Report and Written Opinion", Mar. 16, 2021, 19 pages.

International Application No. PCT/EP2020/079275 , "Invitation to Pay Additional Fees and, where applicable, Protest Fee", Jan. 18, 2021, 14 pages.

Pretet et al., "Singing Voice Separation: A Study on Training Data", 2019 Institute of Electrical and Electronics Engineers International Conference on Acoustics, Speech and Signal Processing, Jun. 6, 2019, pp. 506-510.

Roma et al., "Music Remixing and Upmixing Using Source Separation", Proceedings of the 2nd AES Workshop on Intelligent Music Production, Sep. 13, 2016, 2 pages.

Veire et al., "From Raw Audio to a Seamless Mix: Creating an Automated DJ System for Drum and Bass", Eurasip Journal on Audio, Speech, And Music Processing, vol. 2018, No. 1, Sep. 24, 2018, pp. 1-21.

Woodruff et al., "Remixing Stereo Music With Score-Informed Source Separation", Proceedings of the 7th International Conference on Music Information Retrieval, XP055761326, Oct. 8-12, 2006, 6 pages.

U.S. Appl. No. 17/459,450 , "Notice of Allowance", May 23, 2022, 5 pages.

* cited by examiner

METHOD, DEVICE AND SOFTWARE FOR APPLYING AN AUDIO EFFECT

CROSS REFERENCE TO RELATED APPLICATIONS

This application is a continuation of U.S. patent application Ser. No. 17/459,450 entitled "Method, Device and Software for Applying an Audio Effect", filed Aug. 27, 2021, which is a continuation of PCT/EP2020/079275, filed on Oct. 16, 2020, which PCT/EP2020/07975 application claims priority to PCT/EP2020/056124, filed on Mar. 6, 2020; PCT/EP2020/057330, filed on Mar. 17, 2020; PCT/EP2020/062151, filed on Apr. 30, 2020; PCT/EP2020/065995, filed on Jun. 9, 2020; and PCT/EP2020/074034, filed on Aug. 27, 2020. The full disclosures of each of the above-referenced priority applications are incorporated herein by this reference in their entirety.

DESCRIPTION

The present invention relates to a method for processing music audio data comprising the steps of providing input audio data representing a piece of music containing a mixture of predetermined musical timbres and applying an audio effect to the input audio data. Furthermore, the present invention relates to a device processing music audio data and a software suitable to run on a computer to control the computer to process audio data.

Methods, devices and software of the above described type are conventionally known for various applications in the fields of music production and recording, live mixing, DJ mixing, music broadcasting, etc. The processing of audio mostly implies the application of one or more audio effects, which modify certain sound parameters of the music such as to change the character of the sound without substantially changing the musical composition as such. Examples of known audio effects are reverb effects, delay effects, chorus effects, equalizers, filters, pitch shifting or pitch scaling effects, and tempo shifts (time-stretching/resampling). By virtue of such audio effects, the character of the sound is changed, which differentiates audio effects from mere volume changes. Namely, while volume changes just scale the amplitude of the audio signal by a constant factor leaving the character of the sound unchanged, audio effects typically modify the shape of the waveform of the audio signal.

Another audio processing application is a sound editing environment such as a digital audio workstation (DAW) or similar software, which allows import of a mixed mono or stereo audio file and editing the audio file by application of one or more audio effects. Such audio effects include editing effects such as time stretching, resampling, pitch shifting, reverb, delay, chorus, equalizer (EQ) etc. Digital audio workstations are used by producers or mixing/mastering engineers, in recording studios, postproduction studios or the like.

In most audio processing applications, the input audio data are mono or stereo audio files containing one (mono) or two (stereo) mixed audio tracks of a piece of music. The mixed audio tracks may be produced in recording studios by mixing a plurality source tracks, which are programmed on a computer (for example a drum computer) or obtained from directly recording individual instruments or vocals. In other cases, mixed audio tracks are obtained from live recording of a concert or from recording the output of a playback device, for example a vinyl player. Mixed audio tracks are often distributed by music distributors via streaming or downloading or broadcasted by radio or TV broadcasting services.

It has been found that the application of audio effects can sometimes distort the character of the sound such that the music sounds less natural and the presence of the audio effect becomes audible more than desired. In particular, if the audio effect is applied for the purpose of correcting some acoustic shortfall or for the purpose of matching the sound of one song to that of another song, such as in a DJ environment in which a smooth transition from one song to the another song is desired, it is generally an aim to apply the effect in such a manner that the listener will not recognize the presence of the effect or will at least not perceive a significant change of the character of the piece of music.

For example, the audio effect may be a pitch scaling effect changing the pitch of audio data while maintaining its playback duration, which might be desired by DJs to match the key of one song to that of another song such as to smoothly crossfade between the two songs (without the clashing of different keys). Conventional pitch scaling will lead to an unnatural distortion of the music, when the pitch is shifted by more than one or two semitones. This results in a limitation of the creative freedom of the DJ.

It is therefore an object of the present invention to improve the results of audio effects applied to mixed audio tracks and to avoid unnatural distortion of the music due to audio effects or to provide new options for modifying the character of a piece of music by virtue of audio effects. Specifically, it is an object of the invention, to provide a method, a device and a software for processing audio data, which allow pitch scaling by more than one or two semitones without unnatural distortion of the music.

In order to achieve the above object, according to a first aspect of the present invention there is provided a method for processing music audio data, comprising the steps of (a) providing input audio data representing a first piece of music containing a mixture of predetermined musical timbres, (b) decomposing the input audio data to generate at least a first audio track representing a first musical timbre selected from the predetermined musical timbres, and a second audio track representing a second musical timbre selected from the predetermined musical timbres, (c) applying a predetermined first audio effect to the first audio track, (d) applying no audio effect or a predetermined second audio effect, which is different from the first audio effect, to the second audio track, (e) recombining the first audio track (with the effect applied) with the second audio track to obtain recombined audio data.

Thus, according to an import feature of the present invention the input audio data are decomposed to obtain at least two different audio tracks of different musical timbres, the first audio effect is applied to only one of the two audio tracks, and the audio tracks are then recombined again to obtain recombined audio data. As a result, it becomes possible to apply the first audio effect in a more sophisticated and differentiated manner to affect only selected musical timbres.

For example, a reverb effect may be applied to only a vocal component but not, or only with reduced intensity to a drum component of the audio track, such as to provide new options for modifying the character of the sound of a piece of music by virtue of a reverb effect. In another example, when a PA system for music entertainment is controlled by a DJ, it becomes possible to apply a reverb effect to only a specific instrument, for example a drum, if this instrument is found to cause acoustic problems in the specific surrounding or room of the venue.

The second audio track may receive no audio effect at all such as to remain unchanged, i.e. audio data of the second audio track at the time of its generation in step (b) and at the time of its recombination in step (e) are equal. Alternatively, the second audio track may receive a predetermined second audio effect, which is different from the first audio effect.

In the context of the present invention input audio data are preferably mono or stereo audio files containing one (mono) or two (stereo) mixed audio tracks of a piece of music. The mixed audio tracks may be produced in recording studios by mixing a plurality source tracks, which are programmed on a computer (for example a drum computer) or obtained from directly recording individual instruments or vocals. In other cases, mixed audio tracks are obtained from live recording of a concert or from recording the output of a playback device, for example a vinyl player. Mixed audio tracks are often distributed by music distributors via streaming or downloading or broadcasted by radio or TV broadcasting services.

In the present disclosure, an audio effect is defined by an effect type, such as reverb, chorus, delay, pitch scaling, tempo shifts, etc, and at least one effect parameter, such as a wet/dry parameter, chorus intensity, delay time/intensity, pitch shift value (e.g. number of semitones or cents up/down), or a tempo shift value (e.g. sample rate change ratio) etc. Furthermore, in the present disclosure, two audio effects are different, if they differ in effect type or in at least one effect parameter. Thus the feature that the second audio effect is different from the first audio effect includes cases in which the second audio effect has an effect type which is different from the effect type of the first audio effect, as well as cases in which first and second audio effects have the same effect type but different effect parameters. In addition, in the present disclosure, although some audio effects may involve volume changes, mere volume changes do not qualify as audio effects.

As mentioned above, within the present disclosure, an audio effect is defined as an effect that typically modifies the shape of the waveform of an audio signal contained in music audio data, or modifies at least part of that waveform (in particular a time interval). In this respect, audio effects are distinguished from simple volume changes that just scale the amplitude of the waveform without modifying the shape of the waveform.

An audio effect in the sense of the present invention may comprise at least one of a parametric equalizer (EQ with low, middle, high frequency bands, for example, or with any other frequency bands), a high pass filter, a low pass filter, a flanger (a frequency modulation that uses a delay effect introduced to the signal in a feedback loop), a phaser (a frequency-modulated sound mixed back into the original sound or a sound obtained by phase-shifting of a part of the signal), a chorus, a vocoder, a harmonizer, a pitch shifter, a gate (a filter attenuating signals below a threshold volume level), a reverb effect, a delay effect, an echo effect, a bit crusher (an audio effect producing distortion by reducing the resolution or band width of the input audio data), a tremolo effect, a loop roll effect, a beat roll effect, a beat masher, a censor effect, a back spin effect, a scratch effect (variation of dynamic sample rate conversion and/or forward and reverse playback), and a break effect. Furthermore, an audio effect may be created by combining two or more of such audio effects or other audio effects.

Furthermore, audio effects may have effect parameters, for example beat parameters or timing parameters, wherein a beat or timing parameter may be chosen depending on the beat of the music contained in the audio signal, wherein the beat may be determined by known beat detection algorithms or may be taken from metadata of the audio data. The timing effect parameter may represent the beat or a fraction or a multiple of the beat.

It should be noted that the first audio effect or any audio effect according to the invention may be applied to the entire audio track or only to a time interval of the audio track. Also effect automations are possible in which effect parameter are changed over the playing time.

In an embodiment of the invention, the method according to the first aspect of the invention may be used in a DJ equipment (such as a DJ software, a DJ device etc.) in order to allow the application of audio effects to only selected musical timbres of a song or to allow different audio effects to different musical timbres of a song.

In a further embodiment of the invention, the method according to the first aspect of the invention may be used in a sound editing environment such as a digital audio work-station (DAW) or similar software, which has a functionality to import a mixed mono or stereo audio file as input audio data and to edit the input audio data by application of one or more audio effects. The decomposed first and second audio tracks may then be edited differently and separately from one another, by applying (or not applying) audio effects such as time stretching, resampling, pitch shifting, reverb, delay, chorus, equalizer (EQ) etc. Such digital audio workstation may be used by producers or mixing/mastering engineers, in recording studios, postproduction studios or the like, and it allows to process mixed audio files (for example mixed songs obtained from music distribution services or record labels or from live recording a mixture of different instru-ments or other sound sources). Thus, even if individual tracks of certain musical timbres of a mixed song are not available, the user may obtain access to individual audio tracks of specific musical timbres for the purpose of apply-ing desired audio effects in a more targeted and sophisticated manner.

After application of the first audio effect to the individual audio tracks, in particular the first audio track, the first audio track (with the first audio effect applied) and the second audio track (with no audio effect applied or a different audio effect applied) are recombined again to form a single audio track, which may be stored to a storage medium or further processed or played back.

In another embodiment, the method could include a first playback mode, in which the original input audio data is played back or in which recombined audio data obtained by recombining all decomposed audio tracks (in particular first audio track and second audio track) obtained from decom-posing the input audio data, i.e. without any audio effects and preferably without any volume changes applied to the individual decomposed audio tracks, are played back, and a second playback mode, in which the at least one first audio effect is applied to at least one of the decomposed audio tracks, while the other decomposed tracks are unmodified. By operation of a suitable effect control element, the method could be made, at any desired point in time during the playback duration, to switch from the first playback mode to the second playback mode and/or to switch from the second playback mode to the first playback mode. As a result, the at least one audio effect could be inserted to the desired timbre within a desired time interval, while ensuring continuous, uninterrupted playback of the piece of music. Such first and second playback modes are particularly advantageous for DJ applications of the method where audio effects can be seamlessly turned on and off on the fly.

In another embodiment, which might be particularly advantageous for DAW applications such as in a DAW plug-in, the method may include a step of receiving a user input (for example a user selection) representing a time interval within the piece of music, in which the first audio effect is to be applied to the first (decomposed) audio track, wherein the method is adapted to create and store in a storage unit output data (in particular in a destination audio file) representing a modified version of the piece of music, wherein, at playback positions outside the time interval, the output data correspond to the input audio data, while at playback positions within the time interval, the output data corresponds to a recombination of the first audio track to which the first audio effect has been applied, with at least the second and/or all remaining decomposed audio tracks to which the first audio effect has not been applied. In particular, at playback positions outside the time interval, where the output data correspond to the input audio data, the output data may be substantially equal to the input audio data, or the audio signal of the output data may be substantially phonetically equal to the audio signal of the input audio data, specifically if the output data are obtained by recombination of all decomposed audio tracks (in particular first audio track and second audio track) obtained from decomposing the input audio data of the piece of music, without any audio effects and preferably without any volume changes applied to the individual decomposed audio tracks.

In a preferred embodiment of the invention, the first audio effect is a pitch scaling effect changing the pitch of audio data of the first audio track while maintaining its playback duration/rate. The inventors have found that a pitch scaling effect achieves a much more natural result, when applied only to some of the musical timbres of the piece of music. For example, drum timbres do not have a musical pitch and thus do not need to be pitch shifted, which avoids distortion of the drums, in particular when shifting the pitch by more than one or two semitones up or down. Thus, in such example, only harmonic instrumental timbres (timbres having melodic components or contain actual notes of different pitches according to the key/harmonies of the music) may be pitch shifted such as to shift the key of the piece of music to the desired key, while other timbres, such as drums or maybe spoken, non-melodic vocals, such as in Rap music, may remain unchanged with regard to their pitch.

The advantages of the present invention with regard to pitch scaling become particularly prominent, if, in a preferred embodiment, the pitch is shifted by more than 2 semitones, more preferably more than 5 semitones, even more preferably more than 11 semitones. In particular, pitch shifts by more 5 semitones or even more than 11 semitones allow great freedom for matching the keys of two different songs.

The pitch scaling effect may shift the pitch of the audio data of the first audio track up or down by a predetermined number of semitones. This allows pitch shifts for musical purposes, such as to transpose a song to a different key, which might be useful for a DJ for matching the key of one song to the key of another song, in order to allow simultaneous playback of both songs for several artistic reasons, such as smooth crossfades between the two songs (without clashing of different harmonies).

In another embodiment of the invention, the first audio effect may be a time shifting effect, in particular quantization effect, which is adapted to insert time stretchings or time compressions or perform cutting out time intervals of the audio track at selected positions within an audio track in order to shift certain portions or the audio track such as to match a beat of the piece of music (timing corrections). For example, if one of the musical timbres is found to have incorrect timing or if timing of one of the timbres is to be modified for any other purposes, the user may do such timing changes on the desired audio track, for example the first audio track, without affecting the timing of the audio tracks of the other musical timbres. This feature is particularly relevant when the method is implemented in a digital audio workstation. For example, such method allows to correct or modify the timing of a vocal part of a song without changing the timing of the accompaniment part (remaining or non-vocal timbres of the song). In general, the present invention allows post production of mixed songs by granting access to the original (or near original) audio tracks representing the individual musical timbres (instruments, vocals, etc.) that make up the mixed song, even if, in a post-production situation, such original audio tracks are no longer available to the user.

Preferably, step b of decomposing the audio data generates a first audio track and a second audio track which are complements, such that their sum substantially equals the input audio data. This allows, in step (e) of recombining the first and second audio tracks, to easily return to the audio signal of the original input audio data by removing the audio effect applied to the first or second audio track, respectively.

In a further embodiment of the invention, the first musical timbre is a harmonic vocal timbre (a vocal timbre having melodic components or containing actual notes of different pitches according to the key/harmonies of the music) or a harmonic instrumental timbr<e (an instrumental timbre having melodic components or containing actual notes of different pitches according to the key/harmonies of the music, for example a timbre including at least one of bass, guitars, piano, strings, etc.), or a combination of a harmonic vocal timbre and a harmonic instrumental timbre (denoted as a melodic timbre, for example a timbre which includes all signal components except drums and bass) and/or the second musical timbre is a non-harmonic vocal timbre or a non-harmonic instrumental timbre, preferably a drum timbre. This allows to apply different audio effect settings to harmonic timbres and non-harmonic timbres, respectively, which improves the quality of effects that influence harmonic parameters of the piece of music, for example pitch scaling effects, harmonizer effects or flanger effects. Such effect types have been found by the inventors to achieve much more naturally sounding results when applied to only harmonic timbres of the music, such as guitars, vocals, bass, piano or synthesizer sounds, while keeping the remaining, non-harmonic timbres, essentially free from such effect or applying the effect with reduced intensity.

In a further embodiment of the invention, in step b of decomposing the audio data, there is generated the first audio track, the second audio track, and a third audio track representing a third musical timbre, wherein the first audio track, the second audio track and the third audio track are complements, such that their sum substantially equals the input audio data, wherein in step c, the predetermined first audio effect is applied to the first audio track, but not to the second audio track and not to the third audio track, and wherein in step d, the first audio track with the first audio effect applied, the second audio track and the third audio track are recombined to obtain the recombined audio data. In this embodiment, the input audio data are separated into three audio tracks of different musical timbres, which allows different effect settings to be applied to three different components of the music.

Methods according to the first aspect of the invention use a step of decomposing input audio data to obtain a first and second audio tracks containing different musical timbres. Several decomposing algorithms and services are known in the art as such, which allow decomposing audio signals to separate therefrom one or more signal components of different timbres, such as vocal components, drum components or instrumental components. Such decomposed signals and decomposed tracks have been used in the past to create certain artificial effects such as removing vocals from a song to create a karaoke version of a song, and they could be used in step (b) of the method of the present invention.

However, in preferred embodiments of the present invention, step b of decomposing the input audio data may include processing the input audio data by an AI system containing a trained neural network. An AI system may implement a convolutional neural network (CNN), which has been trained by a plurality of data sets for example including a vocal track, a harmonic/instrumental track and a mix of the vocal track and the harmonic/instrumental track. Examples for conventional AI systems capable of separating source tracks such as a singing voice track from a mixed audio signal include: Pretet, "Singing Voice Separation: A study on training data", Acoustics, Speech and Signal Processing (ICASSP), 2019, pages 506-510; "spleeter"—an open-source tool provided by the music streaming company Deezer based on the teaching of Pretet above, "PhonicMind" (https://phonicmind.com)—a voice and source separator based on deep neural networks, "Open-Unmix"—a music source separator based on deep neural networks in the frequency domain, or "Demucs" by Facebook AI Research—a music source separator based on deep neural networks in the waveform domain. These tools accept music files in standard formats (for example MP3, WAV, AIFF) and decompose the song to provide decomposed/separated tracks of the song, for example a vocal track, a bass track, a drum track, an accompaniment track or any mixture thereof.

In a further preferred embodiment of the invention, output data obtained from the recombined audio data are further processed, preferably stored in a storage unit, and/or played back by a playback unit and/or mixed with second-song output data, wherein obtaining the recombined audio data and/or further processing the output data is preferably performed within a time smaller than 5 second, preferably smaller than 200 milliseconds, after the start of decomposing the input audio data. This has the advantage that the method may run as a continuous process at the time at which the effect is actually needed, for example during a live performance of a DJ. For example, if the time between decomposition and further processing of the audio data is smaller than 200 milliseconds, a DJ can perform a pitch shift basically immediately during a live performance.

In another embodiment of the invention, the method may further comprise the steps of determining a first key of the first piece of music of the input audio data, providing second-song input data representing a second piece of music, determining a second key of the second piece of music of the second-song audio data, and determining a pitch shift value based on the first key and the second key, wherein in step (c), the pitch of the first audio track is shifted by the pitch shift value, while maintaining the pitch of the second track, wherein the method preferably further comprises a step of mixing output data obtained from the recombined audio data with second-song output data obtained from the second-song input data, such as to obtain mixed output data, and wherein the method preferably further comprises a step of playing back playback data obtained from the mixed output data. In such embodiment, the method is specifically suited for an application by a DJ, for example in a DJ equipment, when the keys of two songs are to be matched automatically in order to allow for smooth transitions between the two songs. According to an advantage of the invention, sound artefacts or distortions can be avoided or substantially reduced even when the key of a song is shifted by more than one or two semitones.

According to a second aspect of the present invention, the above object is achieved by a device for processing music audio data, comprising an input unit for receiving input audio data representing a first piece of music containing a mixture of predetermined musical timbres, a decomposition unit for decomposing the input audio data received from the input unit to generate at least a first audio track representing a first musical timbre selected from the predetermined musical timbres, and a second audio track representing a second musical timbre selected from the predetermined musical timbres, an effect unit for applying a predetermined first audio effect to the first audio track and for applying no audio effect or a predetermined second audio effect, which is different from the first audio effect, to the second audio track, and a recombination unit for recombining the first audio track with the second audio track to obtain recombined audio data.

A device of the second aspect can be formed by a computer having a microprocessor, a storage unit an input interface and an output interface, wherein at least the input unit, the decomposition unit, the effect unit and the recombination unit are formed by a software program running on the computer. In this manner, the computer is preferably adapted to carry out a method according to the first aspect of the invention.

In a device of the second aspect of the invention, effect unit may be a pitch scaling unit for changing the pitch of audio data of the first audio track while maintaining its playback duration or playback rate. Such device may show particular advantages when forming part of DJ equipment in which transposition of a song from one key to another is desired. It has been found that sound distortions by pitch scaling can be reduced or avoided, if the pitch scaling effect is applied only to some of the musical timbres included in a piece of music.

The decomposition unit preferably includes an AI system containing a trained neural network, wherein the neural network is trained to separate audio data of a predetermined musical timbre from audio data containing a mixture of different musical timbres. As described above, such AI system are able to separate different musical timbres of a song with high quality.

A device of the second aspect of the invention may further comprise a storage unit adapted to store the output data, which allows further processing of the output data, for example at any later point in time. In another embodiment, the device may have a playback unit adapted to play back the output data, such that the device is prepared to be used as a music player or for public audition of music through connection to a PA system. In another embodiment, the device may have a mixing unit adapted to mix the output data with second-song output data, which allows the use of the device as DJ equipment.

In another embodiment, the device may further comprise a first key detection unit for determining a first key of the first piece of music of the input audio data, a second-song input unit for providing second-song input data representing a second piece of music, a second key detection unit for determining a second key of the second piece of music of the second-song audio data, a pitch shift calculation unit for determining a pitch shift value based on the first key and the second key, wherein the effect unit is a pitch scaling unit adapted to shift the pitch of the first audio track by the pitch shift value, while maintaining the pitch of the second track. In this manner it is possible to match the keys of two songs automatically to enable simultaneous playback of both songs or parts thereof in a DJ environment without incurring sound distortions due to pitch scaling even if the keys of the songs differ from one another by more than one semitone.

In an embodiment of the invention the device is a DJ device. For use as a DJ device, the device may then further comprise a mixing unit adapted to mix output data obtained from the recombined audio data with second-song output data obtained from the second-song input data, such as to obtain mixed output data, and preferably a playback unit adapted to play back playback data obtained from the mixed output data. To obtain a fully integrated DJ system, in which the automatic pitch scaling described above is directly available as a feature, the device may further comprise a second-song input unit for providing second-song input data representing a second piece of music, a mixing unit adapted to mix output data obtained from the recombined audio data with second-song output data obtained from the second-song input data, such as to obtain mixed output data, and a crossfading unit having a crossfading controller that can be manipulated by a user to assume a control position within a control range, wherein the crossfading unit sets a first volume level of the output data and a second volume level of the second-song output data depending on the control position of the crossfading controller, such that the first volume level is maximum and the second volume level is minimum when the crossfading controller is at one end point of the control range, and the first volume level is minimum and the second volume level is maximum when the cross-fading controller is at the other end point of the control range.

In another embodiment of the invention, the device may comprise an effect control unit adapted to allow a user to control an operation of the effect unit, in particular to control the application of at least the first audio effect and/or for controlling an effect type and/or an effect parameter of at least the first audio effect. This allows a user to actively switch on/off or change at least the first audio effect. In this respect it should be noted that the effect unit may have a first operational mode in which it applies the first audio effect to the first audio track, but not to the second audio track, and may have a second operational mode in which it applies the first audio effect to the second audio track, but not to the first audio track. In addition, there may be another operational mode in which the effect unit applies the first audio effect to the first audio track and the second audio track. I.e. first and second audio tracks may be interchanged or routing of the first audio effect may be changed between the audio tracks obtained from the decomposition unit.

Preferably, the effect unit controls a plurality of audio effects, and the effect control unit comprises an effect control element, which is adapted to allow a user to select at least one audio effect from the plurality of audio effects as the first audio effect to be applied to the first audio track. Furthermore, the effect control unit may comprise a parameter control element, which is adapted to allow a user to control at least one effect parameter of the first audio effect. This allows a user not only to choose a suitable audio effect but also to adjust the selected audio effect to his/her needs.

In a further embodiment of the invention, the decomposition unit is adapted to decompose the input audio data to generate a plurality of decomposed audio tracks each representing different timbres selected from the predetermined musical timbres, wherein the effect control unit comprises a routing control element, which is adapted to allow a user to select at least one of the plurality of decomposed audio tracks as the selected decomposed audio track, and wherein the effect unit applies an audio effect or the selected audio effect or the first audio effect to the at least one selected decomposed audio track. A routing control element allows the application of individual audio effects to individual decomposed audio tracks, although it is not necessary to provide a separate effect unit for each decomposed audio track. This reduces costs and provides more flexibility for the user.

Preferably, the effect unit is configured to apply a plurality of different audio effects simultaneously to either one single decomposed audio track or to a plurality of different decomposed audio tracks of the same input audio data (of the same piece of music), i.e. a first audio effect to a first decomposed audio track, and a second audio effect different from the first audio effect to a second decomposed audio track different from the first decomposed audio track, wherein the routing control element may be configured to allow a user to control which audio effect is applied to which decomposed audio track.

In another embodiment of the present invention the decomposition unit is adapted to decompose the input audio data to generate a plurality of decomposed audio tracks, including at least a first decomposed audio track and a second decomposed audio track, wherein each of the plurality of decomposed audio tracks each represents a different timbre selected from the predetermined musical timbres of the same piece of music, and wherein the effect control unit comprises a combo effect control element, which is adapted to control, preferably by a single control operation of a user, application of at least a first audio effect to the first decomposed audio track and a second audio effect different from the first audio effect to the second decomposed audio track. The combo effect control element of this embodiment accelerates the control of the effect unit for predetermined sets of effects applied to predetermined decomposed audio tracks. In particular, by virtue of a single control operation, a user may apply or remove a plurality of different effects to or from different decomposed audio tracks.

An effect control unit of the present invention may comprise two or more effect control sections, each effect control section comprising one or more control elements to control at least one audio effect. This allows controlling two or more audio effects to be applied to the input audio data at the same time. In particular, the audio effects controlled by the effect control sections may be applied to different decomposed audio tracks or they may alternatively be applied to the same decomposed audio track as an effect chain, i.e. sequentially (one of the audio effects is applied to a specific decomposed audio track, and the modified decomposed audio track is then submitted to a second audio effect from the plurality of audio effects and, optionally, afterwards is submitted to one or more additional audio effects). The control elements included in the effect control sections may be effect control elements and/or parameter control elements and/or routing control elements and/or combo effect control elements as described above, or any combination thereof. By using effect control sections in this manner, multiple audio effects may be applied to multiple decomposed audio tracks, while reducing the total number of audio effects (hardware or software modules) actually necessary.

In another embodiment of the invention, the device of the second aspect may be a computer running a digital audio workstation (DAW).

According to a third aspect of the present invention, the above mentioned object of the invention is achieved by a software adapted to run on a computer to control the computer such as to carry out a method of the first aspect of the invention. Such software may be executed/run on known operating systems and platforms, in particular iOS, macOS, Android or Windows running on computers, tablets, and smartphones. The software may be a digital audio workstation (DAW) or a DJ software.

Figure 2:
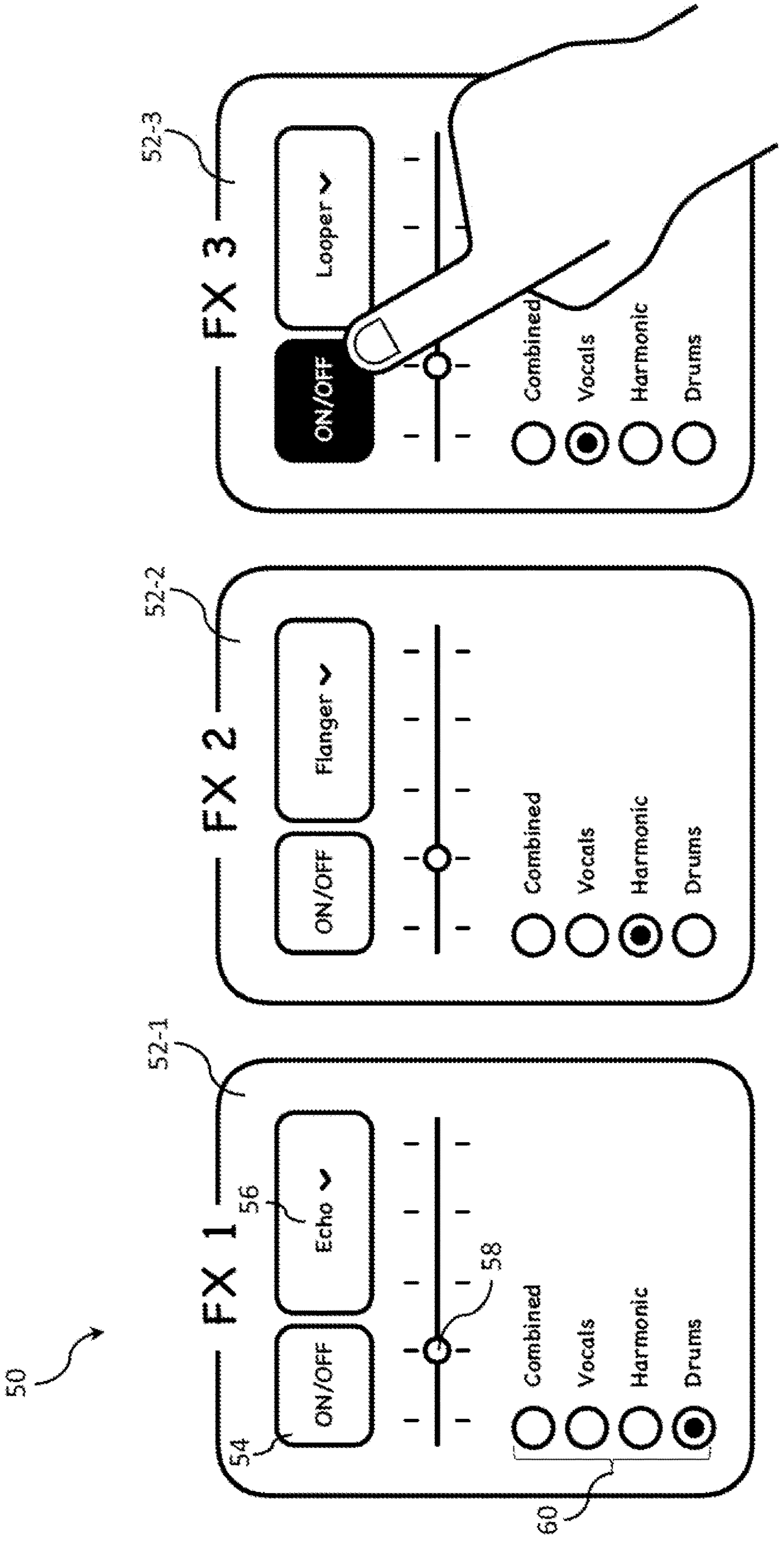
Figure 3:
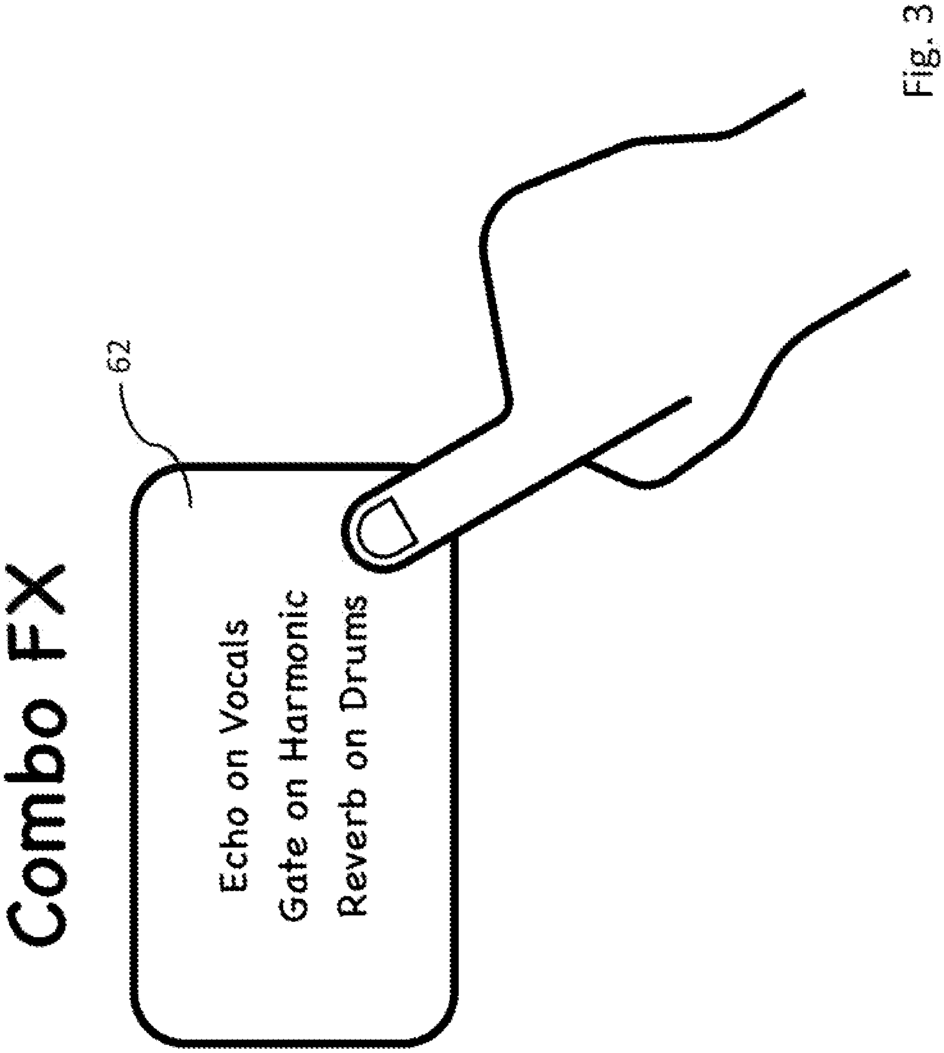
Figure 4:
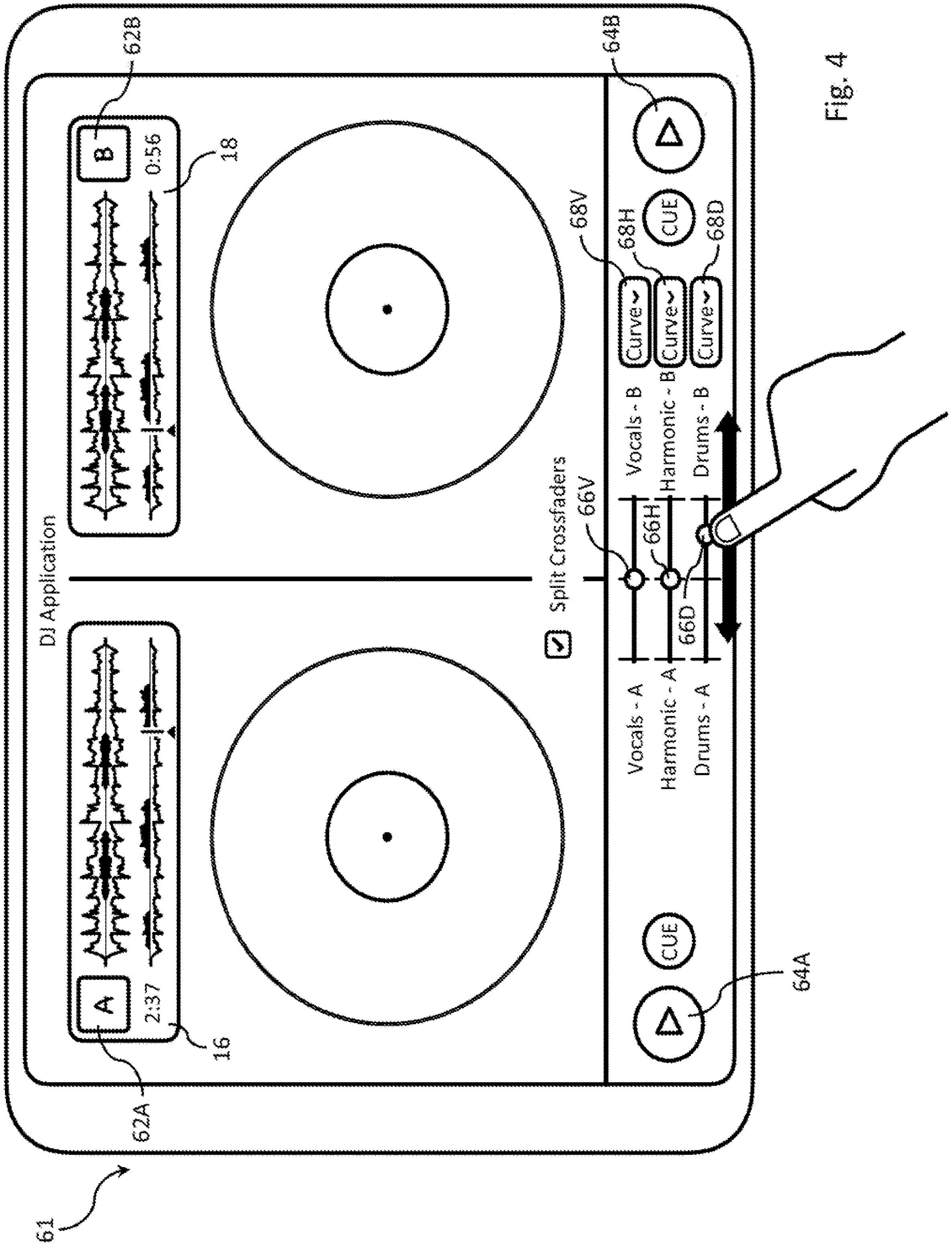
Figure 5:
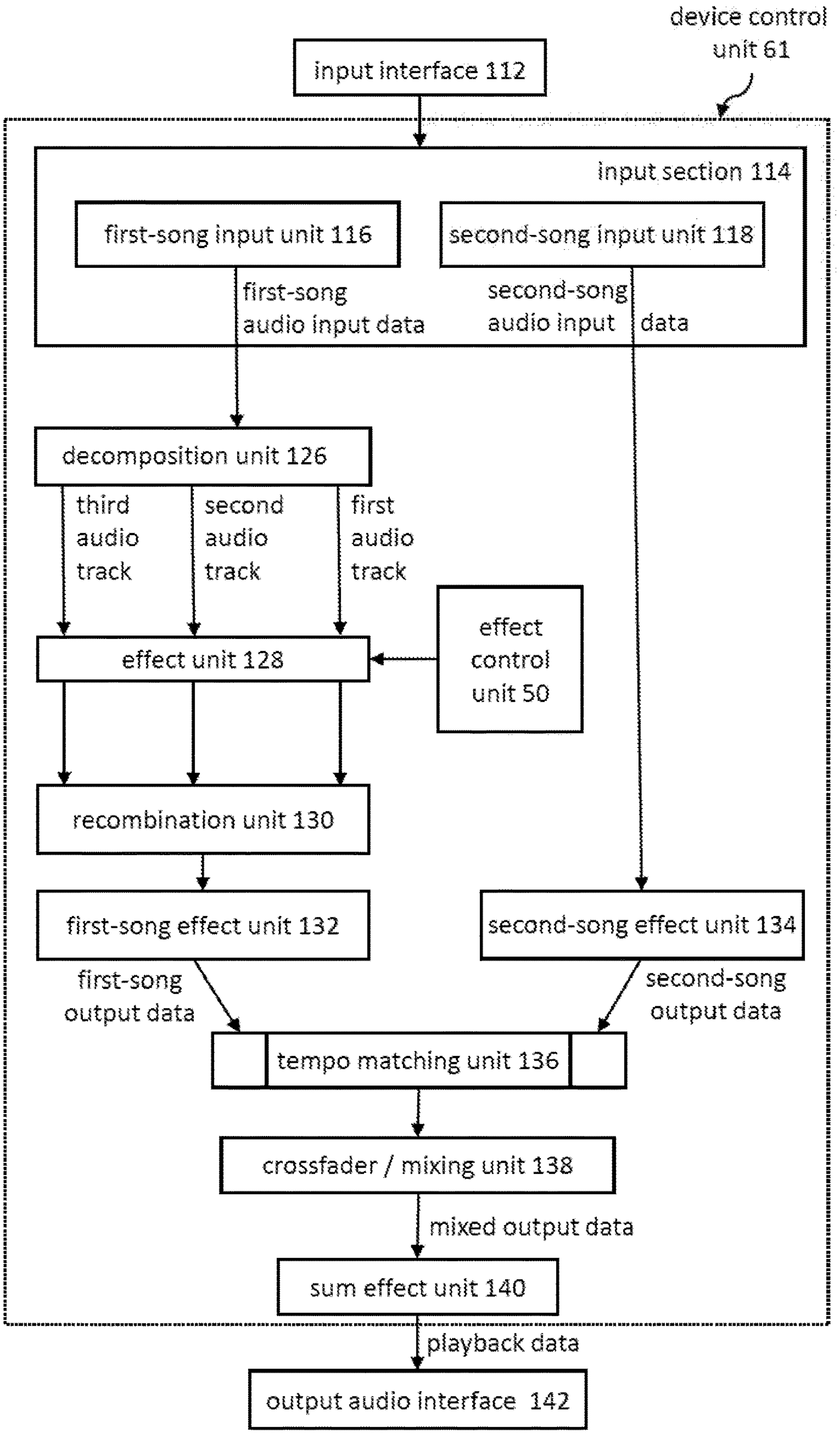

The invention will be further explained by way of a specific embodiment shown in the attached drawing in which FIG. 1 shows a function diagram of a device according to a first specific embodiment of the invention, FIG. 2 shows a layout of an effect control unit of the device according to the specific embodiment, FIG. 3 shows a layout of a combo effect control element of the device according to the specific embodiment, FIG. 4 shows a layout of a DJ control unit that may be used in the specific embodiment of the invention, FIG. 5 shows a function diagram of a device according to a second specific embodiment of the invention.

In FIG. 1, components of a device according to a first embodiment are shown, which may all be integrated as hardware or software modules installed on a computer, for example a tablet computer or a smartphone. Alternatively, these hardware or software modules may be parts of a stand-alone DJ device, which includes a housing on which control elements such as control knobs or sliders are mounted to control functions of the device.

The device may include an input interface 12 for receiving input audio data or audio signals. The input interface, may be adapted to receive digital audio data as audio files via a network or from a storage medium. Furthermore, the input interface 12 may be configured to decode or decompress audio data, when they are received as encoded or compressed data files. Alternatively, the input interface 12 may comprise an analog-digital converter to sample analog data received from an analog audio input (for example a vinyl player or a microphone) and to obtain digital audio data as input audio data.

The input audio data provided by input interface 12 are then routed to an input section 14 which contains a first-song input unit 16 and a second-song input unit 18, which are adapted to provide audio data of two different songs according to a user selection. In particular, the device may have a user input interface, for example a touch screen, to allow a user to choose songs from a song database and to load it into the first-song input unit 16 or the second-song input unit 18. The audio file of the selected song may be completely loaded into a local memory of the device or portions of the audio file may be continuously streamed (for example via internet from a remote music distribution platform) and further processed before receiving the entire file. In this way, the first-song input unit 16 provides first-song audio input data according to a first song selected by a user, and the second-song input unit 18 provides second-song audio input data according to a second song selected by a user.

The first-song audio input data may then be routed to a first key detection unit 20 to detect a first key of the first song, while the second-song audio input data are routed to a second key detection unit 22 to detect a second key of the second song. First and second key detection units 20, 22 are preferably arranged to detect a key or root or fundamental tone of the piece of music according to the 12 semitones of the chromatic scale (e.g. one of C, C sharp, D, D sharp, E, F, F sharp, G, G sharp, A, A sharp, B), including the mode (major or minor). A conventional key detection module may be used as first and second key detection unit, respectively. Furthermore, first and second keys may be detected one after another by one and the same key detection unit.

First and second keys may be input into a pitch shift calculation unit 24, which calculates a pitch shift value based on a difference between the two keys. The pitch shift value may be a number of semitones by which the first key needs to be shifted up or down in order to match the second key. Alternatively the pitch shift value may be a number of semitones by which the first key needs to be shifted up or down in order to assume a key that differs from the second key by a fifth. It has been found that two songs may be mixed and play simultaneously without audible harmonic interference, for example during a crossfading between the two songs, if both songs are at the same key or if their keys differ by a fifth.

After passing the key detection unit 20 the first-song audio input data are routed to a decomposition unit 26 which contains an AI system having a trained neural network adapted to decompose the first song audio input data to generate at least a first audio track representing a first musical timbre, a second audio track representing a second musical timbre, and a third audio track representing a third musical timbre. For example, the first musical timbre. In the present example, the first musical timbre may be a harmonic timbre (e.g. including a sum of vocals, guitars, keys, synthesizers, etc.), the second musical timbre may be a non-harmonic timbre, such as a percussion timbre, and the third musical timbre may be another non-harmonic timbre, such as a drum timbre.

Only the first audio track representing the first musical timbre is then routed into a pitch shifting unit 28, which shifts the pitch of the audio data by a predetermined number of semitones up or down, based on the pitch shift value received from the pitch shift calculation unit 24. The second audio track and the third audio track are not routed to the pitch shifting unit 28 but rather bypass the pitch shifting unit 28. Thus, in the present example, only the first audio track including the harmonic timbres is submitted to the pitch shifting, whereas the second and third tracks which include the non-harmonic timbres, maintain their pitch.

First audio track, including pitch shift, second audio track and third audio track are then routed into a recombination unit 30 in which they are recombined again into a single audio track (mono or stereo track). Recombination may be performed by simply mixing the audio data.

The recombined audio data obtained from recombination unit 30 may then be passed through a first-song effect unit 32 in order to apply some other audio effect, such as a high pass or low pass filter, or an EQ filter, if desired, and to output the result as first-song output data.

On the other hand, the second-song audio input data obtained from the second-song input unit 18 may be passed to any desired effect units as well, similar as those described for the first embodiments. In the illustrated example, the second-song audio input data are passed through a second-song effect unit 34 in order to apply an audio effect, such as a high pass or low pass filter, or an EQ filter, and to output the result as second-song output data.

First-song and second-song output data may then be passed through a tempo matching unit 36 which detects a tempo (BPM value) of both songs and changes the tempo of at least one of the two songs (without changing its pitch) such that both songs have matching tempi. Matching tempi means that the BPM value of one of the two songs equals the BPM value or a multiple of the BPM value of the other song. Such tempo matching units are known in the art as such.

Afterwards, first-song and second-song output data (matched in tempo, if applicable) may be routed into a mixing unit 38, in which they are mixed with one another to obtain mixed output data (mono or stereo) that contain a sum of both signals. Mixing unit 38 may contain or may be connected to a crossfader, which can be manipulated by a user to assume a control position within a control range, wherein the crossfader sets a first volume level of the first-song output data and a second volume level of the second-song output data depending on the control position of the crossfading controller, such that the first volume level is maximum and the second volume level is minimum when the crossfading controller is at one end point of the control range, and the first volume level is minimum and the second volume level is maximum when the crossfading controller is at the other end point of the control range. Mixing unit 38 then mixes (sums) the first-song and second-song output data according to the first volume level and the second volume level, respectively, to obtain mixed output data (mono or stereo).

The mixed output data may then be passed through a sum effect unit 40 to apply any further audio effect, if desired. The output of the sum effect unit 40 may be denoted as playback data and may be played back by an output audio interface 42. Output audio interface 42 may include and audio buffer and a digital to analog converter to generate a sound signal. Alternatively, the playback data may be transmitted to another device for playback, storage or further processing.

FIGS. 2 to 4 show layouts of control units of the device according to the first embodiment of the invention, which may be operated by a user to control the device. Elements shown in the layouts and described in the following may be displayed by a suitable display of the device controlled by a software running on the device. Alternatively or in addition, these layouts or parts thereof may be realized by hardware design, for example of a DJ device, and the control elements may be realized by control knobs, sliders, switches and so on.

As can be seen in FIG. 2, an effect control unit 50 may comprise a plurality of effect control sections, for example three effect control sections 52-1, 52-2 and 52-3. Each effect control section may comprise one or more control elements for controlling type, parameter and routing of audio effects. In the present embodiment, the first effect control section 52-1 may comprise an on/off control element 54 which may be operated by a user to alternatively switch on or switch off the effect control section 52-1, in particular to switch on or off the audio effect associated to this effect control section 52-1.

First effect control section 52-1 may also include an effect control element 56, which is adapted to allow a user to select one of a plurality of audio effects. For example, effect control element 56 may be implemented by a drop-down element or a list selection element or the like, or may open an effect browser or similar dialogue, which allows choosing a particular audio effect (effect type), or may be realized by a previous/next control button to step through the list of available audio effects and select an effect with each step. In the example shown in FIG. 2, an echo effect is selected as the audio effect of the first effect control section 52-1.

First effect control section 52-1 may further comprise a parameter control element 58, which is adapted to allow a user to set or modify or otherwise control at least one effect parameter of the audio effect that is selected by effect control element 56. In the present example shown in FIG. 2, where an echo effect is selected by effect control element 56, parameter control element 58 may control a timing of the echo, i.e. a time interval between the original sound and the echo sound. The device of the present embodiment may contain a beat detection unit that detects the beat of the first-song audio input data. A timing of the selected effect, for example a timing of the echo effect, may then be set as particular fractions or multiples of the duration of a beat. This allows reducing the time required for the user to find an appropriate timing for the audio effect.

First effect control section 52-1 may further comprise a routing control element 60, which allows selecting one of the plurality of decomposed audio tracks obtained from decomposition unit 26. In the present embodiment, routing control element 60 may allow a selection between the first audio track, the second audio track and the third audio track obtained from the decomposition unit 26 (e.g. vocal track, harmonic track and drums track). Upon selection of any of the three decomposed audio tracks, the audio effect selected by effect control element 56, optionally influenced by the setting of parameter control element 58, will be routed to the selected decomposed audio track (only), for example to either the vocal track or the harmonic track or the drums track. As a further option, routing control element 60 may have another option "combined" which may be selected in order to route the selected audio effect to all decomposed tracks at the same time.

The second effect control section 52-2 and/or the third 52-3 and/or any further effect control section may contain similar control elements as those described above for the first effect control section 52-1, i.e. an on/off control element, an effect control element, a parameter control element and/or a routing control element. Thus, multiple audio effects may be applied to the audio input data at the same time and may be controlled easily by a user.

FIG. 3 shows a combo effect control element 62 that may be used in the effect control unit 50 in addition to or as an alternative to the at least one effect control section 52-1, 52-2, or 52-3. Combo effect control element 62 allows the control of multiple audio effects by a single control operation. In the present example, combo effect control element 62 is a push button that may be pushed by a user for alternative activation and deactivation. When activated, combo effect control element 62 applies two or more audio effects to two or more different decomposed audio tracks at the same time. In the example shown in FIG. 3, pushing the combo effect control element 62 applies an echo effect to the vocal track, a gate effect to the harmonic track and a reverb effect to the drums track, wherein all effects are applied simultaneously and will be removed upon the next operation of the push button. Alternatively the effects may be applied simultaneously upon operation of the push button and may remain activated as long as the user presses the push button, while they will be removed when the push button is released.

FIG. 4 shows the layout of a device control unit suitable to control a device according to the first embodiment of the invention, in particular a device as schematically illustrated in FIG. 1. First-song input unit 16 and second-song input unit 18 are shown in FIG. 4 as graphical representations of a song A and a song B, respectively. In particular, waveforms of songs A and B are displayed. Song-selection control elements 62A and 62B may be operated by a user to select song A as first-song audio input data and song B as second-song audio input data, respectively. Songs A and B may be selected from an external audio source or from an online music distribution service for streaming via the Internet or from a local data storage device.

Device control unit 61 may further comprise play/stop control elements 64A, 64B for starting or stopping playback of song A and song B, respectively.

In addition, Device control unit 61 may have at least one volume control element for controlling the volume of song A and/or song B. The volume control element may be configured as a cross-fader, which allows controlling the volumes of both songs A and B with only one single control element (not illustrated in FIG. 4). In the present configuration as depicted in FIG. 4, Device control unit 61 may have individual cross-faders for the individual decomposed tracks, for example a vocal cross-fader 66V and/or a harmonic cross-fader 66H and/or a drums cross-fader 66D (and/or, as a further option, a bass cross-fader, not illustrated). Each decomposed track cross-fader 66V, 66H, 66D is adapted to be controlled between two end points, wherein at the first end point the volume of the decomposed track of song A is maximum and the volume of the corresponding decomposed track of song B is minimum, whereas at the second end point the volume of the decomposed track of song A is minimum and the volume of the corresponding decomposed track of song B is maximum. When moving or operating one of the decomposed track cross-fader between the two end points, the volumes of the decomposed tracks of songs A and B are each modified according to a predetermined transition function or a predetermined transition curve. The function or curve may be fixed or it may be modified or selected from a plurality of predetermined functions or curves by operation of curve control elements 68V, 68H, 68D associated to the individual decomposed track cross-faders 66V, 66H, 66D, respectively. Typical examples of DJ style crossfader curves are: intermediate, dipped, cut, constant power, etc.

Effect control unit 50 and/or device control unit 61 may be configured to control one or more of the units described above with reference to FIG. 1, in particular the pitch shifting unit 28, the recombination unit 30 or the sum effect unit 40. In particular, recombination unit 30 may comprise an effect unit which is adapted to apply one or more audio effects to the incoming first to third audio tracks according to the settings of effect control unit 50, before recombining the audio tracks. Furthermore, recombination within recombination unit 30 may be performed based on the settings controlled by a user through device control unit 61, in particular based on the settings of decomposed track cross-faders 66V, 66H, 66D, respectively.

Another possible integration of the effect control unit 50 and the device control unit 61 in a device according to the present invention will now be described with respect to the function diagram of FIG. 5 showing a second embodiment of the invention. It should be noted that the device according to the second embodiment is a modification of the device of the first embodiment in such a way as the device of the second embodiment allows for even more flexibility or control options for a user as regards the application of different audio effects to different decomposed audio tracks. It should be noted, that the functions of the device of the first embodiment as shown in FIG. 1 may be realized as one possible operational mode of the device of the second embodiment, while the device of the second embodiment offers additional operational modes, as will be described in the following. Only the differences with respect to the first embodiment will be explained in more detail, while reference is to be made to the description above of the first embodiment with regard to all other features and functions.

In a device of the second embodiment as depicted in FIG. 5, an input interface 112 receives input audio data or audio signals, which are transferred to an input section 114. Input section 114 is adapted to receive first-song audio input data through a first-song input unit 116 and second-song audio input data through a second-song input unit 118. At least the first-song audio input data are further transferred to a decomposition unit 126 which is adapted to decompose the input data based on a trained neural network integrated within decomposition unit 126 such as to obtain a plurality of decomposed audio tracks of different timbres, for example a first audio track, a second audio track and a third audio track (for example a vocal track, a harmonic track and a drum track).

In this embodiment, all decomposed tracks are input into an effect unit 128, which is configured to apply one or more audio effects to selected decomposed tracks among the received decomposed tracks, depending on the settings made by a user within effect control unit 50. Thus, each of the decomposed tracks may receive either no audio effect, one audio effect or a plurality of different audio effects, which differ in either effect type or effect parameter.

The decomposed tracks that have passed effect unit 128 are then routed into recombination unit 130, in which they will be mixed together to obtain a single mixed audio signal. The volume levels of the individual decomposed tracks based on which they are mixed within recombination unit 130 may be set through user control using control elements such as solo/mute, faders, etc. Specifically, the volume levels may be set through the decomposed track cross-faders 66V, 66H, 66D described above with reference to FIG. 4.

Optionally, the audio signal output by recombination unit 130 may pass a first-song effect unit 132 for application of at least one additional audio effect. Afterwards, the audio signal will be routed towards a cross-fader/mixing unit 138 for mixing with the second-song audio input data. Second-song audio input data may be received directly from input section 114 or they may be passed through a second-song effect unit 134 for application of at least one audio effect before mixing with the first-song output data. In addition, as also described above for the first embodiment, the first-song output data and the second-song output data may be input into a tempo-matching unit 136 for synchronizing or matching the tempo/beat of the two songs, which allows for a smooth mixing of the two songs. Mixed output data obtained from the cross-fader/mixing unit 138 may further be passed through a sum effect unit 140 for application of an additional audio effect, if desired or they may directly be forwarded towards output audio interface 142 for output.

As further visible in FIG. 5, device control unit 61 may be used to control the units of the device. Furthermore, as noted above, the device of the first embodiment as well as the device of the second embodiment may be implemented as a DJ device or as a DJ software, which can run on a computer, including a tablet or a smartphone, or on a standalone hardware device. Furthermore, one or more of the elements and functions described above, in particular one or more of the above-described units may be implemented as a software module such as a software plug-in for integration into another audio processing software, such as a DJ software or a digital audio work station software (DAW).

Further aspects of the present invention are described by the following items:

1. Device for processing music audio data, comprising
   - an input unit for receiving input audio data representing a first piece of music containing a mixture of predetermined musical timbres,
   - a decomposition unit for decomposing the input audio data received from the input unit to generate at least a first audio track representing a first musical timbre selected from the predetermined musical timbres, and a second audio track representing a second musical timbre selected from the predetermined musical timbres,
   - a first effect unit for applying a predetermined first audio effect to the first audio track, but not to the second audio track,
   - a recombination unit for recombining the first audio track with the second audio track to obtain recombined audio data.
2. Device of item 1, wherein the first effect unit is a pitch scaling unit for changing the pitch of audio data of the first audio track while maintaining its playback duration.
3. Device of item 1 or item 2, wherein the decomposition unit includes an AI system containing a trained neural network, wherein the neural network is trained to separate audio data of a predetermined musical timbre from audio data containing a mixture of different musical timbres.
4. Device of at least one of items 1 to 3, further comprising a storage unit adapted to store the output data, and/or playback unit adapted to play back the output data, and/or a mixing unit adapted to mix the output data with second-song output data.
5. Device of at least one of items 1 to 4, further comprising
   - a first key detection unit for determining a first key of the first piece of music of the input audio data,
   - a second-song input unit for providing second-song input data representing a second piece of music,
   - a second key detection unit for determining a second key of the second piece of music of the second-song audio data,
   - a pitch shift calculation unit for determining a pitch shift value based on the first key and the second key,
   - wherein the first effect unit is a pitch scaling unit adapted to shift the pitch of the first audio track by the pitch shift value, while maintaining the pitch of the second track.
6. Device of item 5, further comprising a mixing unit adapted to mix output data obtained from the recombined audio data with second-song output data obtained from the second-song input data, such as to obtain mixed output data, and preferably a playback unit adapted to play back playback data obtained from the mixed output data.
7. Device of at least one of item 1 to 6, further comprising
   - a second-song input unit for providing second-song input data representing a second piece of music,
   - a mixing unit adapted to mix output data obtained from the recombined audio data with second-song output data obtained from the second-song input data, such as to obtain mixed output data, and
   - a crossfading unit having a crossfading controller that can be manipulated by a user to assume a control position within a control range, wherein the crossfading unit sets a first volume level of the output data and a second volume level of the second-song output data depending on the control position of the crossfading controller, such that the first volume level is maximum and the second volume level is minimum when the crossfading controller is at one end point of the control range, and the first volume level is minimum and the second volume level is maximum when the crossfading controller is at the other end point of the control range.
8. Device of at least one of items 1 to 7, comprising a computer having a microprocessor, a storage unit an input interface and an output interface, wherein at least the input unit, the decomposition unit, the first effect unit and the recombination unit are formed by a software program running on the computer, wherein the software is preferably adapted to control the computer such as to carry out a method according to the first aspect of the invention.

The invention claimed is:

1. A method for processing music audio data, comprising:

providing input audio data representing a first piece of music, the input audio data comprising a mixture of predetermined musical timbres;

decomposing the input audio data to generate at least a first audio track representing a first musical timbre selected from the predetermined musical timbres for a time period represented by the input audio data, and a second audio track representing a second musical timbre selected from the predetermined musical timbres for the time period represented by the input audio data;

receiving, via user input to an effect control unit, input (A) controlling an application of a first audio effect to the first audio track or (B) actively switching on/off or changing the first audio effect;

applying, to the second audio track, (A) no audio effect or (B) a second audio effect, wherein the second audio effect is different from the first audio effect; and obtaining recombined audio data by at least recombining the first audio track having the applied predetermined first audio effect with the second audio track having (A) no audio effect applied or (B) the applied predetermined second audio effect.

2. The method of claim 1, wherein the predetermined first audio effect is a pitch scaling effect that changes a pitch of audio data of the first audio track while maintaining a playback duration of the audio data of the first audio track.

3. The method of claim 1, wherein the first audio track and the second audio track generated from the decomposed input audio data are complements, such that a sum of the first audio track and the second audio track generated from the decomposed input audio data is substantially equal to the input audio data.

4. The method of claim 1, wherein one or more of:

the first musical timbre is a harmonic vocal timbre or a harmonic instrumental timbre; or the second musical timbre is a non-harmonic vocal timbre or a non-harmonic instrumental timbre.

5. The method of claim 1, wherein decomposing the input audio data further comprises generating a third audio track representing a third musical timbre, wherein the first audio track, the second audio track and the third audio track generated from the input audio data are complements, such that a sum of the first audio track, the second audio track and the third audio track generated from the input audio data substantially equals to the input audio data, wherein the predetermined first audio effect is applied to the first audio track, but not to the second audio track and not to the third audio track, and wherein obtaining the recombined audio data comprises at least recombining:

(1) the first audio track having the applied predetermined first audio effect, (2) the second audio track having (A) no audio effect applied or (B) the applied predetermined second audio effect, and (3) the third audio track.

6. The method of claim 1, wherein decomposing the input audio data further comprises processing the input audio data by an artificial intelligence ("AI") system comprising a trained neural network, wherein the neural network is trained to decompose the input audio data to generate at least the first audio track and the second audio track.

7. The method of claim 1, further comprising:

determining output data from the recombined audio data; and further processing the output data.

8. The method of claim 7, wherein further processing the output data comprises one or more of (a) storing the output data in a storage unit, (b) playing back the output data by a playback unit, or (c) mixing the output data with second-song output data.

9. The method of claim 1, wherein the user input further controls a selection of at least one audio effect from a plurality of audio effects as the first audio effect to be applied to the first audio track.

10. A device for processing music audio data, comprising:

an input unit for receiving input audio data representing a first piece of music comprising a mixture of predetermined musical timbres;

a decomposition unit for decomposing the input audio data received from the input unit to generate at least a first audio track representing a first musical timbre selected from the predetermined musical timbres and a second audio track representing a second musical timbre selected from the predetermined musical timbres;

an effect unit for applying a first audio effect to the first audio track, but not to the second audio track;

a recombination unit for obtaining recombined audio data by recombining the first audio track with the second audio track; and an effect control unit for allowing a user to (A) control operation of the effect unit, including to apply the first audio effect to the first audio track, or (B) actively switch on/off or change the first audio effect.

11. The device of claim 10, wherein the effect unit comprises a pitch scaling unit for changing a pitch of audio data of the first audio track while maintaining a playback duration of the audio data of the first audio track.

12. The device of claim 10, wherein the decomposition unit includes an artificial intelligence (AI) system comprising a trained neural network, wherein the neural network is trained to decompose the input audio data to generate at least the first audio track and the second audio track.

13. The device of claim 10, further comprising one or more of:

a storage unit for storing output data determined from the recombined audio data;

a playback unit for playing back the output data; or a mixing unit for mixing the output data with second-song output data.

14. The device of claim 10, wherein the effect unit controls a plurality of audio effects, and wherein the effect control unit comprises an effect control element, wherein the effect control element allows the user to select at least one audio effect from the plurality of audio effects as the first audio effect to be applied to the first audio track.

15. The device of claim 10, wherein the effect control unit comprises a parameter control element, wherein the parameter control element allows control of at least one effect parameter of the first audio effect.

16. The device of claim 10, wherein the decomposition unit is adapted to decompose the input audio data to generate a plurality of decomposed audio tracks, the plurality of decomposed audio tracks comprising at least a first decomposed audio track and a second decomposed audio track, wherein each of the plurality of decomposed audio tracks each represents a respective different timbre selected from the predetermined musical timbres of the same piece of music, and wherein the effect control unit comprises a combo effect control element, wherein the combo effect control element is adapted to control an application of at least a first audio effect to the first decomposed audio track and a second audio effect to the second decomposed audio track, wherein the second audio effect is different from the first audio effect.

17. The device of claim 16, wherein the combo effect control element is adapted to control the application of at least the first audio effect to the first decomposed audio track and the second audio effect to the second decomposed audio track by a single control operation of a user.

18. The device of claim 10, further comprising:

a computer comprising a microprocessor, a storage unit, an input interface, and an output interface, wherein at least the input unit, the decomposition unit, the effect unit and the recombination unit are formed by a software executed by the microprocessor, wherein the software is configured to control the computer to perform operations of the input unit, the decomposition unit, the effect unit, and the recombination unit.

19. A non-transitory computer-readable storage medium comprising computer readable program instructions stored therein that when executed by a computer cause the computer to perform operations comprising:

providing input audio data representing a first piece of music, the input audio data comprising a mixture of predetermined musical timbres;

decomposing the input audio data to generate at least a first audio track representing a first musical timbre selected from the predetermined musical timbres for an entire time of the input audio data, and a second audio track representing a second musical timbre selected from the predetermined musical timbres for the entire time of the input audio data;

receiving, via user input to an effect control unit, input (A) controlling an application of a first audio effect to the first audio track or (B) actively switching on/off or changing the first audio effect;

applying, to the second audio track, (A) no audio effect or (B) a predetermined second audio effect, wherein the predetermined second audio effect is different from the predetermined first audio effect; and obtaining recombined audio data by at least recombining the first audio track having the applied predetermined first audio effect with the second audio track having (A) no audio effect applied or (B) the applied predetermined second audio effect.

20. The non-transitory computer-readable storage medium of claim 19, wherein the user input further controls a selection of at least one audio effect from a plurality of audio effects as the first audio effect to be applied to the first audio track.

* * * * *